Reissued Feb. 18, 1930

Re. 17,599

UNITED STATES PATENT OFFICE

WILHELM KOLLE AND KARL STREITWOLF, OF FRANKFORT-ON-THE-MAIN, AND ALFRED FEHRLE, OF SODEN-ON-THE-TAUNUS, GERMANY, ASSIGNORS, BY MESNE ASSIGNMENTS, TO WINTHROP CHEMICAL COMPANY, OF NEW YORK, N. Y., A CORPORATION OF NEW YORK

BENZIMIDE-AZOLON ARSONIC ACIDS AND PROCESS FOR PREPARING THE SAME

No Drawing. Original No. 1,674,368, dated June 19, 1928, Serial No. 123,589, filed July 19, 1926, and in Germany July 31, 1925. Application for reissue filed June 11, 1929. Serial No. 370,147.

Our present invention relates to the preparation of benzimideazolonarsonic acids.

By causing phosgene to act upon orthodiaminobenzenearsonic acids benzimideazolonarsonic acids are obtained, thus for instance from 3.4-diaminobenzenearsonic acid the 3.4 benzimideazolonarsonic acid having the formula:

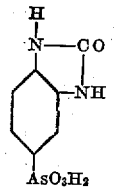

This acid differs only slightly as to its therapeutic efficacy from the aromatic arsonic acids hitherto used in medical practice.

Now we have found that the homologues and alkylene derivatives of the said acid prove to be of a considerably higher therapeutic value, which fact could not be foreseen, since Bertheim states in Berichte vol. 45, page 2135, with reference to investigations and experiments made by F. Leupold and others, that 4-dimethylaminophenyl-arsonic acid and 4-amino-3-methyl-phenylarsonic acid have a lower therapeutic efficacy than the p-arsanilic acid. Similar experiments were made regarding dye-stuffs. Therefore the general conclusion was drawn that the entrance of a methyl group into those compounds impairs their therapeutic action.

But contrary to the experiments above referred to, the acids hereafter described are of a higher therapeutic efficacy than the non-substituted 3.4-benzimideazolonarsonic acid.

The following example illustrates our invention, but is not intended to limit it thereto:

11.6 parts by weight of 3-amino-4-methylaminobenzenearsonic acid, obtained by reduction of the corresponding nitroacid (see Bertheim-Berichte vol. 44 (1911) 3095 and Bauer-Berichte vol. 48 (1915) page 517), are dissolved in 210 parts by volume of a 2 N. solution of sodium acetate and while stirring phosgene is introduced, whereupon the benz-(4-methyl)-imideazolonarsonic acid separates in the form of crystals.

The resulting acid is washed with water and recrystallized from water or it is purified by dissolving in dilute caustic soda solution and reprecipitating by means of hydrochloric acid.

In an analogous manner from 3-chloro-4-nitrobenzenearsonic acid or 3-nitro-4-chlorobenzenearsonic acid, the former prepared by treating 3-chloro-4-nitraniline with arsenic according to Bart, there are produced the corresponding homologues or alkylene substituted benzimideazolonarsonic acids by causing the first mentioned acids to act upon such compounds as ethylamine propylamine, allylamine, benzylamine and by reducing subsequently the nitro group and treating the reduction product so obtained with phosgene.

Such homologous or alkylene substituted benzimideazolonarsonic acids are for instance:

3.4-benz-(4-propyl)-imideazolonarsonic acid which is rather difficultly soluble in water, soluble in methyl alcohol and insoluble in acetone.

3.4-benz-(4-allyl)-imideazolonarsonic acid which is capable of being recrystallized from water, insoluble in acetone and soluble in wood-alcohol.

3.4-benz-(4-benzyl)-imideazolonarsonic acid which is very difficultly soluble in water, more readily soluble in methyl alcohol and insoluble in acetone.

3.4-benz-(3-methyl)-imideazolonarsonic acid which is difficultly soluble in methyl alcohol, capable of being recrystallized from water, insoluble in acetone.

We claim:

1. Process for preparing benzimideazolonarsonic acids, which consists in causing phosgene to act upon a benzenearsonic acid of the general formula:

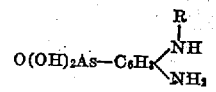

wherein R stands for alkyl, an unsaturated alkyl group or aralkyl.

2. Process for preparing 3.4-benzimideazolonarsonic acids, which consists in causing phosgene to act upon a benzenearsonic acid of the formula:

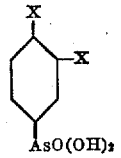

wherein the X's stand for amino groups, one of which is substituted by alkyl, an unsaturated alkyl group or aralkyl.

3. Process for preparing 3.4-benz-(4-methyl)-imideazolonarsonic acid, which consists in causing phosgene to act upon the compound of the formula:

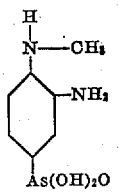

4. As new products, the benzimideazolonarsonic acids of the formula:

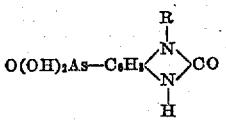

wherein R stands for alkyl, an unsaturated alkyl group or aralkyl.

5. As new products, the benzimideazolonarsonic acids of the formula:

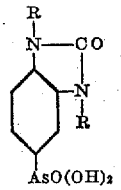

wherein one R stands for hydrogen and the other R stands for alkyl, an unsaturated alkyl group or aralkyl.

6. As a new product, the 3.4-benz-(4-methyl)-imideazolonarsonic acid of the formula:

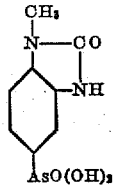

In testimony whereof, we affix our signatures.

WILHELM KOLLE.
KARL STREITWOLF.
ALFRED FEHRLE.